(12) United States Patent
Takakusaki et al.

(10) Patent No.: US 6,594,509 B1
(45) Date of Patent: Jul. 15, 2003

(54) ARRAY-ANTENNA RADIO COMMUNICATION APPARATUS

(75) Inventors: Keiji Takakusaki, Yokohama (JP); Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/701,651

(22) PCT Filed: Mar. 16, 2000

(86) PCT No.: PCT/JP00/01592

§ 371 (c)(1),
(2), (4) Date: Nov. 30, 2000

(87) PCT Pub. No.: WO00/60766

PCT Pub. Date: Oct. 12, 2000

(30) Foreign Application Priority Data

Apr. 1, 1999 (JP) .......................................... 11-095418

(51) Int. Cl.[7] .................................................. H04B 1/38
(52) U.S. Cl. ...................... 455/562; 455/561; 455/67.1; 455/424; 342/174; 342/378
(58) Field of Search ................................ 455/561, 562, 455/67.1, 67.4, 423, 424; 342/144, 378; 370/320, 321, 335, 337, 342, 345

(56) References Cited

U.S. PATENT DOCUMENTS

| 4,538,150 A |   | 8/1985  | Bone, Jr.         |         |
|-------------|---|---------|-------------------|---------|
| 5,530,449 A | * | 6/1996  | Wachs et al.      | 342/174 |
| 5,546,090 A | * | 8/1996  | Roy et al.        | 342/174 |
| 6,037,898 A | * | 3/2000  | Parish et al.     | 342/174 |
| 6,070,079 A | * | 5/2000  | Kuwahara          | 455/561 |
| 6,141,567 A | * | 10/2000 | Youssefmir et al. | 455/562 |
| 6,148,219 A | * | 11/2000 | Engelbrecht et al.| 455/562 |
| 6,347,234 B1| * | 2/2002  | Scherzer          | 455/562 |

FOREIGN PATENT DOCUMENTS

| EP | 0938204   |   | 8/1999 |            |
|----|-----------|---|--------|------------|
| JP | 1241203   |   | 9/1989 |            |
| JP | 2265302   |   | 10/1990|            |
| JP | 11-046180 | * | 2/1999 | H04J/13/00 |

OTHER PUBLICATIONS

PCT International Search Report dated Jun. 20, 2000.
Ryu Miura, "A Calibration Method for DBF Receiving Array Antenna by Using Maximal–Ratio–Combining Weights," Technical Report of IEICE, A–P97–96 (Sep. 1997), pp. 19–26.

* cited by examiner

*Primary Examiner*—Quochien Vuong
*Assistant Examiner*—Lana Le

(57) ABSTRACT

A reception radio circuit 104 and a reception radio circuit 105 receive radio communication signals from a mobile station 109 and calibration signals from a CAL-CDMA radio signal transmission section 110 through respective a reception antenna 102 and a reception antenna 103, followed by performing down-conversion of received signals. A reception CDMA signal processing section B (for CAL) 107 measures characteristic errors of respective reception radio circuits while observing the calibration signals undergoing down-conversion, before holding the measured characteristic errors in a compensation table of a recorder 108. A reception CDMA signal processing section A (for communication) 106 performs CDMA demodulation processing of radio communication signals from the mobile station 109, which signals are subjected to the down-conversion, at the same time as observing operation of the reception CDMA signal processing section B (for CAL) 107, on the basis of the characteristic errors held in the compensation table.

11 Claims, 13 Drawing Sheets

ARRAY-ANTENNA RADIO COMMUNICATION APPARATUS

TECHNICAL FIELD

The present invention relates to a mobile radio communication apparatus. More particularly, the present invention relates to a mobile radio communication apparatus provided with an array antenna.

BACKGROUND ART

In recent years, a method for mounting an array antenna on a radio communication apparatus is used in order to set directivity of the apparatus in receiving freely. The array antenna is configured with a plurality of antennas. This array antenna adjusts the amplitude and phase and so forth of signals received through the respective antennas, thereby enable to set directivity of the apparatus in receiving freely. In addition, a signal processing section which performs predetermined processing on the received signal multiplies the signals received through the antennas by complex coefficients, thereby adjusts the amplitude and phase and so forth of the signals. Hereinafter, a conventional radio communication apparatus provided with an array antenna is described with reference to FIG. 1.

FIG. 1 is a block diagram illustrating a configuration of a communication system employing a conventional array antenna radio communication apparatus. In FIG. 1, the circumstances are illustrated, in which a base station 11 mounted with a radio communication apparatus provided with a conventional array antenna performs communication with a mobile station 18.

In the base station 11, radio signals from the mobile station 18 are received through a reception antenna 12 and a reception antenna 13. The signals received through the reception antenna 12 and 13 are subjected to down-conversion into either a base frequency band or an intermediate frequency band respectively in a reception radio circuit 14 and 15, and the resultant signal are outputted to a reception signal processing section 16.

In the reception signal processing section 16, the signals outputted from the respective reception radio circuit 14 and 15 are subjected to demodulation processing, thus reception signals are obtained. In this demodulation processing, signals outputted from the reception radio circuit 14 and 15 are also subjected to a processing that the signals possess a specific characteristic (hereinafter referred to as reception directivity) that receives an electromagnetic wave arriving from desired direction strongly. This processing is performed by obtaining an appropriate complex coefficients multiplied by above-described signals. Therefore, it is possible to receive only a required wave while removing interference waves, thus SIR (Signal to Interference Ratio) of the above-described reception signals is kept highly.

However, the specific characteristics of the reception radio circuit 14 and the reception radio circuit 15 are different individually caused by dispersion of characteristics of analog elements such as an amplifier and so forth employed in an internal section thereof. For this reason, signals received through the reception antenna 12 and the reception antenna 13 are influenced caused by each different unknown amplitude fluctuations or a phase rotation or so forth in the respective reception radio circuit 14 and reception radio circuit 15. Consequently, reception signals which are actually obtained due to the multiplication of the complex coefficient in the reception signal processing section 16 include errors caused by the above-described influences, thus the reception signals possess reception directivity different from what is expected first.

In order to prevent the above described phenomenon, it is necessary to adjust the reception radio circuit 14 and the reception radio circuit 15 so that the characteristics of each reception radio circuit is identical with that of each other. However, it is exceedingly difficult to adjust the characteristics of the analog elements such as an amplifier and so forth accurately and invariably on time.

Accordingly, the characteristics of the reception radio circuit 14 and the reception radio circuit 15 are not adjusted, but the respective characteristics of the reception radio circuit 14 and the reception radio circuit 15 are measured beforehand. In the reception signal processing section 16, the adjustment process (hereinafter referred to as calibration) that determines a complex coefficient to be multiplied while taking account of variations of amplitude and a phase of reception signals corresponding to errors of the characteristics of respective reception radio circuits is adopted.

Generally, the calibration is executed before starting communication in order to measure the characteristics of the respective reception radio circuits. Hereinafter, the calibration method is described referring to FIG. 1 again.

A calibration (CAL) radio signal transmission section 19 which generates radio signals for the calibration is placed at a known position for the base station 11. In the base station 11, the radio signal for the calibration transmitted from the calibration radio signal transmission section 19 is received through the reception antenna 12 and the reception antenna 13.

The signals received through the reception antenna 12 and the reception antenna 13 are outputted to the reception signal processing section 16 through respective the reception radio circuit 14 and the reception radio circuit 15 whose settings are switched so as to enable the radio signals for the calibrations to be received.

In the reception signal processing section 16, respective output signals of the reception radio circuit 14 and the reception radio circuit 15 are observed. Then, deviations on the basis of expected values of amplitude and a phase of output signals of respective reception radio circuits 14 and 15 are held in a compensation table as characteristic errors to be compensated on communication. The compensation table is stored in a recording section 17 provided at an internal portion or an outer portion of the reception signal processing section 16.

After completion of the calibration, in the reception signal processing section 16, when a setting is switched so as to demodulate reception signals transmitted from the mobile station 18, ordinary communication is performed. On the ordinary communication, in the reception signal processing section 16, processing is performed so as to compensate characteristic errors of the respective reception radio circuits while referring to contents of the above-described compensation table.

However, there are problems indicated below for the above-described conventional radio communication apparatus provided with the array antenna. Namely, the base station which is mounted with the radio communication apparatus having the above-described conventional array antenna can not perform communication with a mobile station and calibration processing at the same time. For this reason, either one of the communication with the mobile station or the calibration processing is performed preferentially.

However, when the calibration processing is performed preferentially, it is possible to improve the reception directivity in the base station. On the contrary, since the communication with the mobile station should be discontinued in every calibration processing, inconvenience that smooth communication with the mobile station can not be realized occurs.

While when the communication with the mobile station is performed preferentially, it is possible to perform the communication with the mobile station smoothly. On the contrary, since the calibration processing is restricted, inconvenience that reception directivity of the reception signal in the base station deteriorates, occurs.

Thus, in the conventional radio communication apparatus with the array antenna, since the apparatus should make a sacrifice of either one of smooth communication with the mobile station or accuracy of the reception directivity. As a result, there is a problem that it is difficult to realized such apparatus as a practical apparatus.

DISCLOSURE OF INVENTION

The present invention is achieved in consideration of such points. The object of the present invention is to provide an array antenna radio communication apparatus that performs calibration processing while continuing communication with a mobile station.

This object is achieved by determining a frequency band used for communication for respective communication ends and a frequency band used for communication of radio signals for the calibration so that each frequency is identical, thereby enabling to demodulate communication signals and calibration signals at the same time.

BEST MODE FOR CARRYING OUT THE INVENTION

Embodiments of the present invention will be described specifically below with reference to accompanying drawings.

Embodiment 1

Figure 1:
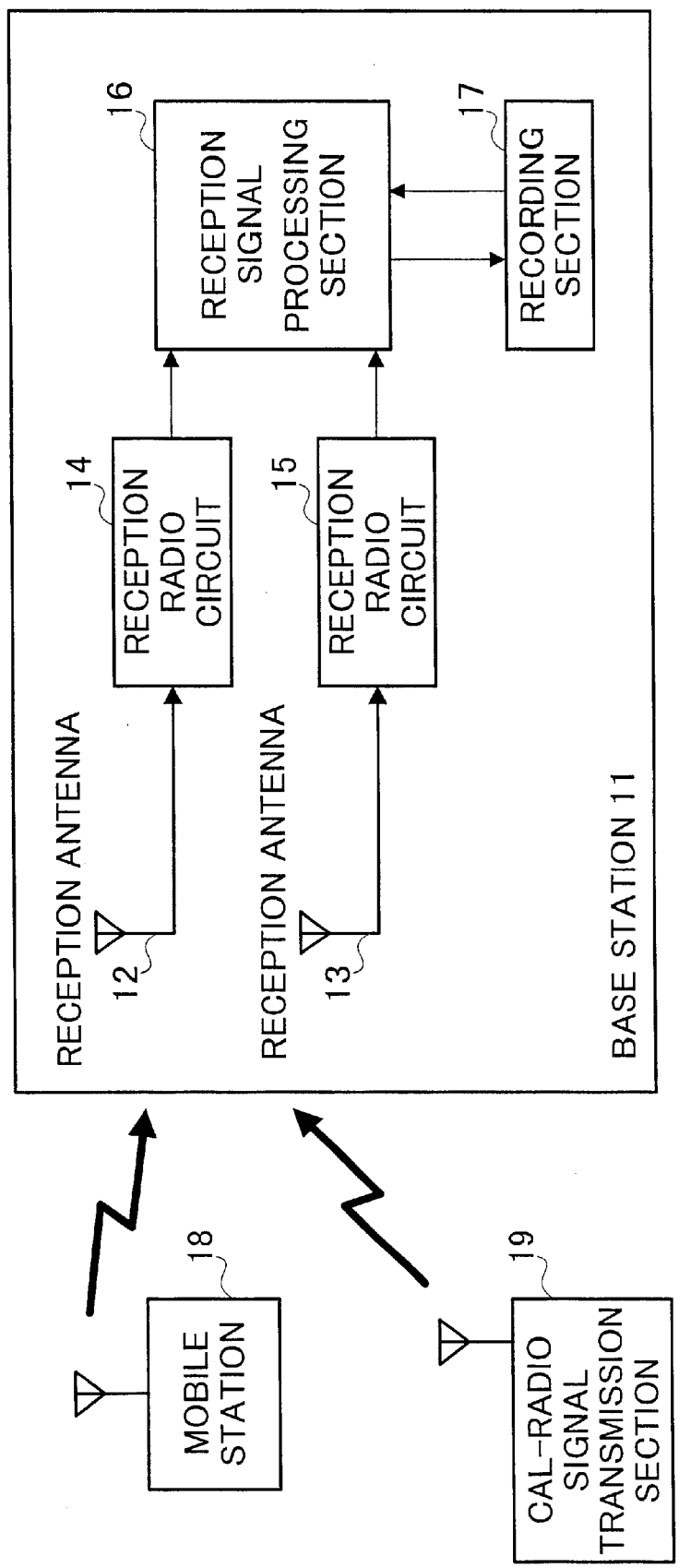
FIG. 1 is a block diagram illustrating a configuration of a communication system employing a conventional array antenna radio communication apparatus.
Figure 2:
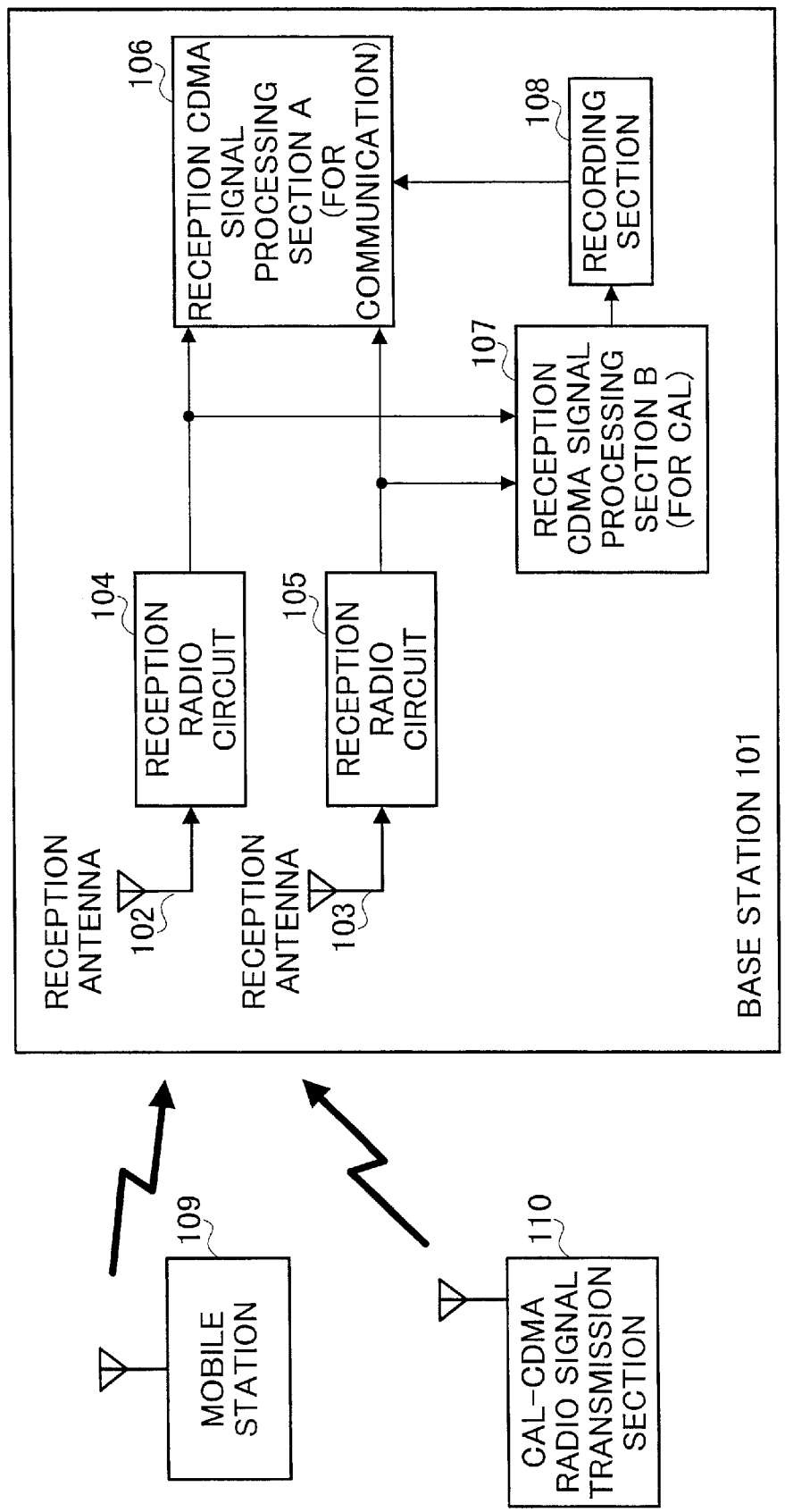
FIG. 2 is a block diagram illustrating a configuration of a communication system employing an array antenna radio communication apparatus according to an embodiment 1 of the present invention.

FIG. 2 is a block diagram illustrating a configuration of a communication system employing an array antenna radio communication apparatus according to an embodiment 1 of the present invention. In FIG. 2, the state of the case in which a base station 101 mounted with an array antenna radio communication apparatus according to the present embodiment performs communication with a mobile station 109 is illustrated.

The mobile station 109 transmits radio signals to the base station 101. A calibration CDMA radio signal transmission section 110 generates radio signals for calibration to the base station 101.

In the base station 101, a reception antenna 102 and a reception antenna 103 receive radio signals from the mobile station 109 and radio signals for calibration from the calibration CDMA radio signal transmission section 110, followed by outputting these radio signals to a reception radio circuit 104 and a reception radio circuit 105 respectively.

The reception radio circuit 104 and the reception radio circuit 105 perform down-conversion of radio signals from the mobile station 109 outputted from respective the reception antenna 102 and the reception antenna 103 into a base frequency band or an intermediate frequency band, before outputting to a reception CDMA signal processing section A (for transmission) 106. Further, the reception radio circuit 104 and the reception radio circuit 105 perform down-conversion of radio signals for the calibration outputted from the calibration CDMA radio signal transmission section 110 in the same way as above, before outputting to a reception CDMA signal processing section B (for CAL) 107. Moreover, switching operation of a switching section (not illustrated) provided for respective reception radio circuit 104 and reception radio circuit 105 selects whether or not the respective reception radio circuits input therein the radio signals for the calibration from the calibration CDMA radio signal transmission section 110.

The reception CDMA signal processing section B (for CAL) 107 observes the radio signals for the calibration outputted through the reception radio circuit 104 and the reception radio circuit 105, followed by outputting characteristic errors of the respective reception radio circuits to a recording section 108.

The recording section 108 holds the characteristic errors outputted from the reception CDMA signal processing section B (for CAL) 107 in a compensation table. Since the above-described characteristic errors are measured every reception radio circuit independently, the compensation table is made out by the number of the reception radio circuit independently. Further, the recording section 108 can be also provided for the reception CDMA signal processing section B (for CAL) 107.

The reception CDMA signal processing section A (for transmission) 106 performs CDMA demodulation processing on the signals transmitted from the reception radio circuit 104 and the reception radio circuit 105. On the CDMA demodulation processing, the reception CDMA signal processing section A (for transmission) 106 refers to a compensation table held in the recording section 108, followed by performing processing of causing the above-described signal to be possessed reception directivity.

Further, in FIG. 2, since an example is illustrated, in which the radio signal from only the mobile station 109 is demodulated, the reception signal processing section is illustrated by only one system, however in the present embodiment, needless to say, there are provided plural systems of reception signal processing sections for demodulating radio signals from a plurality of mobile stations.

Further, in the present embodiment, since as an example, there is described the case where an array antenna reception function due to two antennas is provided, there are provided respective two units of reception antennas, reception radio circuits, and switching sections provided for the reception radio circuit. However, the present invention is capable of making a change in the number of the units appropriately without being restricted by this limitation.

Figure 3:
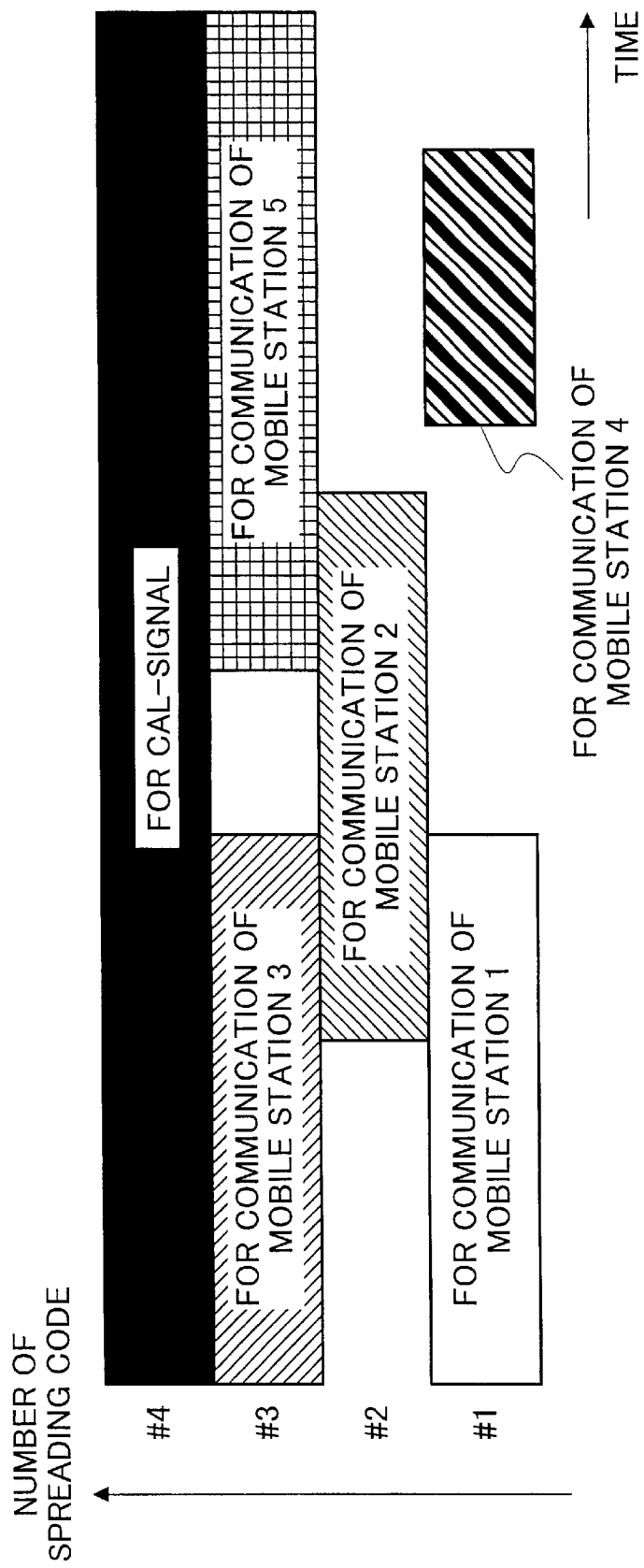
FIG. 3 is a view illustrating an assignment state of spreading codes in a communication system employing the array antenna radio communication apparatus according to the above-described embodiment 1.

Subsequently, regarding operation of the communication system employing the array antenna radio communication apparatus of the above-described configuration will be further described referring to FIG. 3. FIG. 3 is a view illustrating an assignment state of spreading codes in the communication system employing the array antenna radio communication apparatus according to the embodiment 1 of the present invention.

In the present embodiment, both communication signals employed for communication between the base station 101 and the respective mobile stations, and calibration signals employed for the communication between the base station 101 and the calibration CDMA radio signal transmission section 110 are multiplexed in accordance with CDMA (Code Division Multiple Access) system.

In order to perform CDMA multiplexing, each different spreading code (channel) is assigned to the respective mobile stations in the middle of communication and the calibration CDMA radio signal transmission section 110. In FIG. 3, as an example, an assignment state of the spreading codes is illustrated, in which four kinds of the spreading codes from #1 to #4 are prepared.

The three kinds of the spreading codes from #1 to #3 are assigned to respective three mobile stations. Due to this assignment, the three mobile stations assigned the spreading code capable of performing communication at the same time. In this state, when communication of one mobile station is concluded, the spreading code assigned to the mobile station is transferred to another mobile station. This state is illustrated in FIG. 3 clearly. For instance, the spreading code #3 assigned to the mobile station 3 is assigned to the mobile station after a conclusion of the communication of the mobile station 3.

Further, one spreading code (as an example, spreading code #4 in FIG. 3) is assigned fixedly for a calibration CDMA communication signal without reference to the state of communication of another mobile stations. According to this disposition, the calibration CDMA radio signal transmission section 110 is capable of transmitting the calibration CDMA radio signal constantly.

In the first place, in FIG. 2, a CDMA radio signal from the mobile station 109 is received by the base station 101 through the reception antenna 102 and the reception antenna 103. The CDMA radio signal received through the reception antenna 102 and the reception antenna 103 is subjected to the down-conversion due to respective the reception radio circuit 104 and the reception radio circuit 105 into either the base frequency band or the intermediate frequency band, followed by being outputted to the reception CDMA signal processing section (for transmission) 106.

In the reception CDMA signal processing section A (for transmission) 106, CDMA demodulation processing is executed to the signals transmitted from the reception radio circuit 104 and the reception radio circuit 105, thus the signals are changed into reception signals. In this CDMA demodulation processing, the signals transmitted from the respective reception radio circuits are multiplied by a complex coefficient. When the complex coefficients multiplied by the signals are adjusted so that the signals are capable of being received successfully in that only an electromagnetic wave which arrives from desired direction can be received strongly due to the above assignment of the complex coefficient.

Calibration processing described later is performed at all times or intermittently in parallel with the above processing.

The radio signal for the calibration is generated by the calibration CDMA radio signal transmission section 110 placed at a position which is already known by the base station 101. In the base station 101, the radio signal for the calibration is transmitted to respective the reception radio circuit 104 and the reception radio circuit 105 in which a setting of a switching section is switched so as to enable the calibration radio signal to be received due to the switching section provided within an internal section of both of the reception radio circuit 104 and the reception radio circuit 105 through the reception antenna 102 and the reception antenna 103.

In the reception radio circuit 104 and the reception radio circuit 105, the above-described calibration radio signal is outputted to the reception CDMA signal processing section B (for CAL) 107 after the down-conversion described above.

In the reception CDMA signal processing section B (for CAL) 107, deviations on the basis of expected values of amplitude and a phase and so forth of output signals of the respective reception radio circuits are measured due to observations of respective output signals of the reception radio circuit 104 and the reception radio circuit 105. Further, the above-described measured deviations are held in a compensation table as characteristic errors to be corrected on the occasion of transmission. Since the measurement of the above-described deviation, namely, the characteristic errors is executed in every described respective reception radio circuits independently, the compensation table is provided by the number of the above-described reception radio circuits independently. Further, the above-described compensation table is stored in the recording section 108 provided on the inside or the outside of the reception CDMA signal processing section 107 for the calibration.

Contents of the compensation table are transmitted to the reception CDMA signal processing section A (for transmission) 106 from the recording section 108.

Subsequently, in the reception CDMA signal processing section A (for transmission) 106, demodulation processing is executed to the CDMA radio signal from the mobile station 109, namely, the signals transmitted from the reception radio circuit 104 and the reception radio circuit 105 so as to compensate the characteristic errors of the respective reception radio circuits while referring to the contents of the compensation table transmitted from the recording section 108.

Thus, according to the present embodiment, the respective different spreading codes are assigned to the respective CDMA radio signals of the respective mobile stations and the calibration CDMA radio signals. For that reason, the base station extracts the CDMA radio signal of the mobile station and the calibration CDMA radio signal individually, so that the base station is capable of demodulating respective signals at the same time or intermittently. Due to this disposition, the base station is capable of performing the calibration processing at all times or frequently while continuing communication with the respective mobile stations, therefore, the base station is capable of executing communication with the mobile stations smoothly, and it is possible to improve accuracy of reception directivity of the reception signal at the same tome.

Embodiment 2

The above-described embodiment 1 implements communication of the CDMA system between the base station and the respective mobile stations as well as between the base station and the calibration CDMA radio signal transmission section. While an embodiment 2 employs a TDMA (Time Division Multiple Access) system in stead of the CDMA system in the embodiment 1. Hereinafter, an array antenna radio communication apparatus according to the embodiment 2 will be described employing FIG. 4 and FIG. 5 while taking notice of different points from the embodiment 1.

Figure 4:
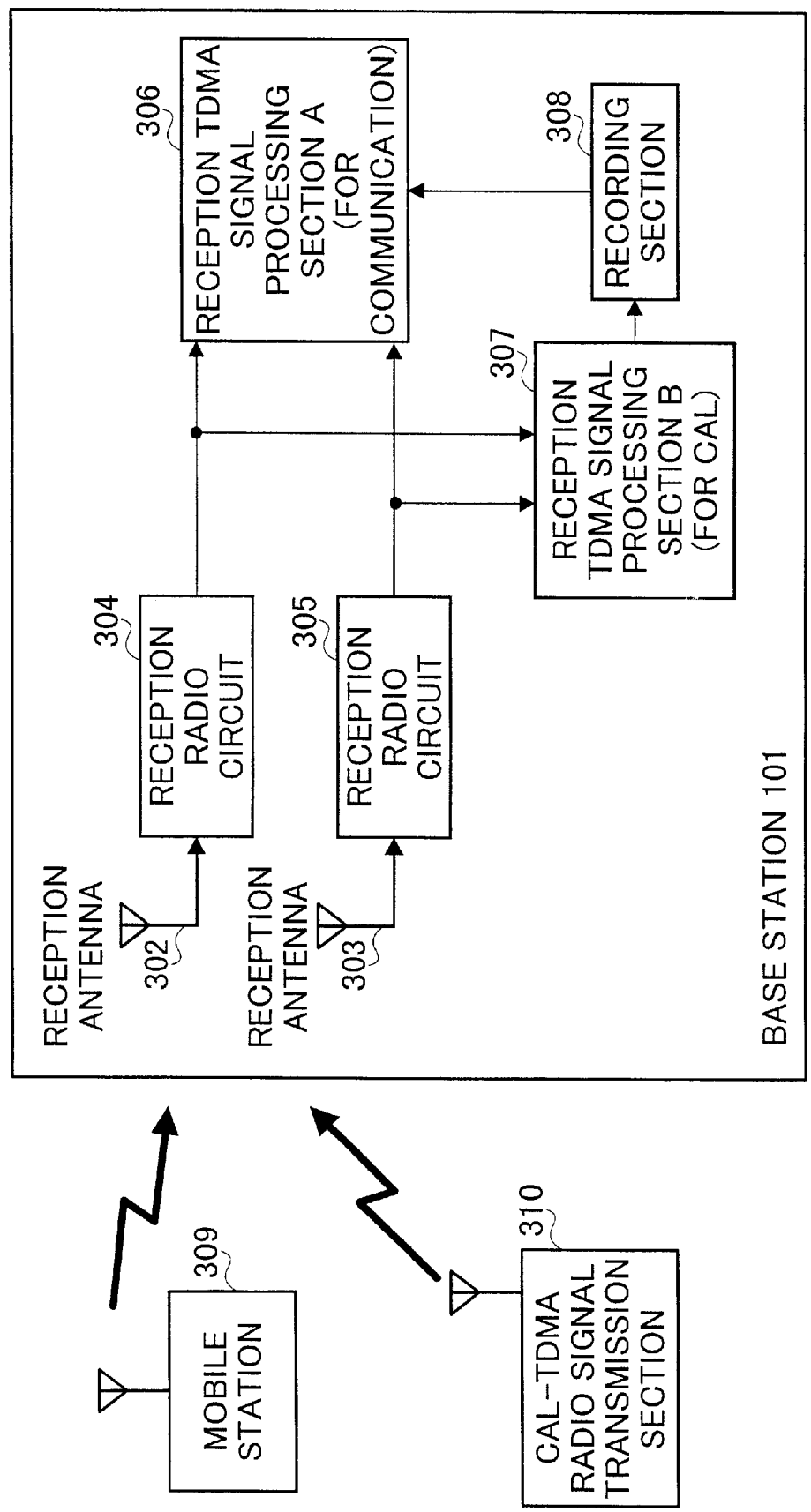
FIG. 4 is a block diagram illustrating a configuration of a communication system employing an array antenna radio communication apparatus according to an embodiment 2 of the present invention.
Figure 5:
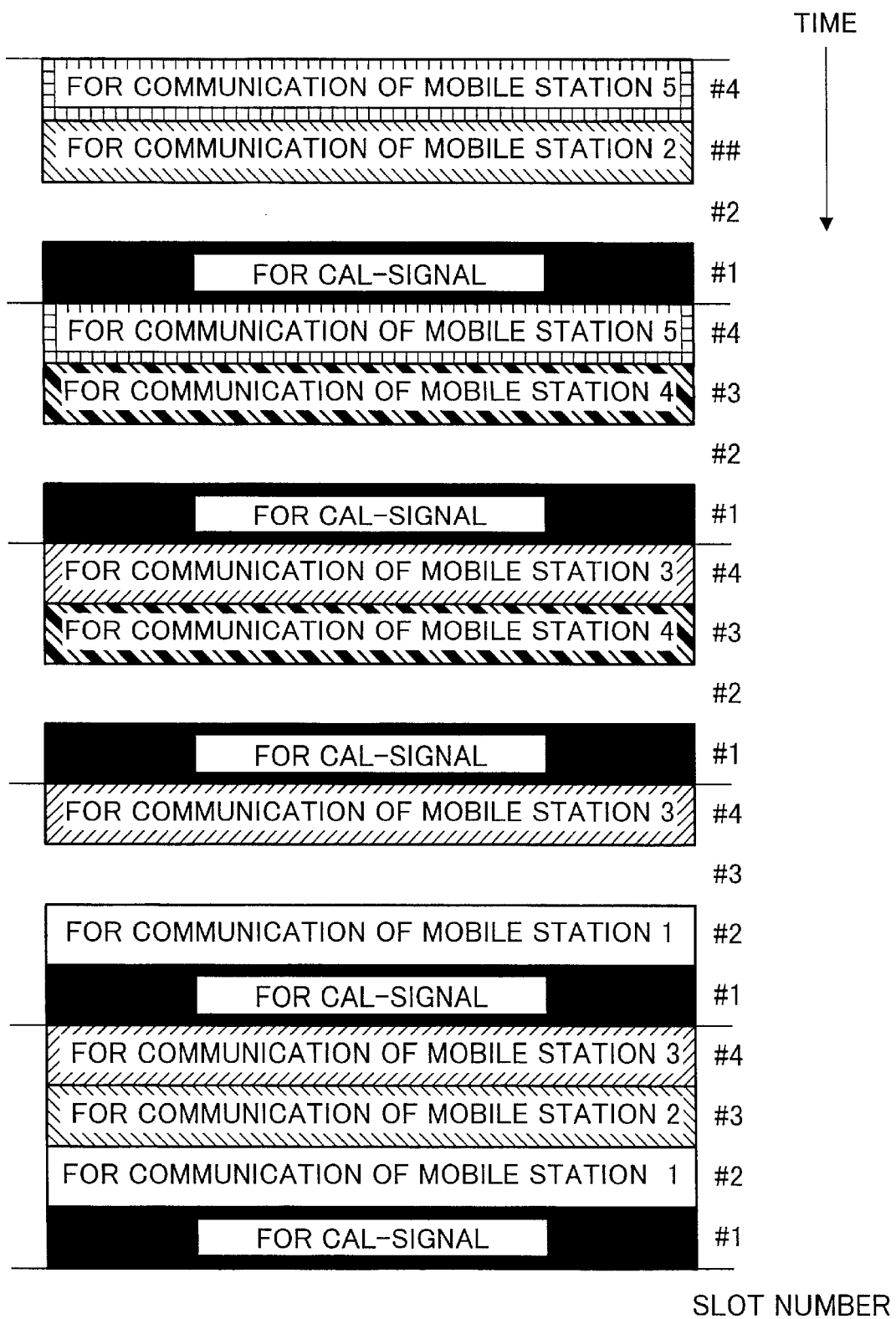
FIG. 5 is a view illustrating a assignment state of spreading codes in a communication system employing the array antenna radio communication apparatus according to the above-described embodiment 2.

FIG. 4 is a block diagram illustrating a configuration of a communication system employing an array antenna radio communication apparatus according to the embodiment 2 of the present invention. FIG. 5 is a view illustrating an assignment state of spreading codes in the communication system employing the array antenna radio communication apparatus according to the embodiment 2 of the present invention.

In the present embodiment, both communication signals employed for the communication between a base station 301 and respective mobile stations, and calibration signals employed for communication between the base station 301 and a calibration TDMA radio signal transmission section 310 are multiplexed in accordance with the TDMA system.

In order to execute the TDMA multiplexing, the embodiment 2 varies respective numbers of time slots (channel) which allow transmission with respect to the respective mobile stations which are in communication and the calibration TDMA radio signal transmission section 310 which is in communication. In FIG. 5, as an example, an assignment state of the time slot is illustrated in which four time slots from #1 to #4 are prepared.

The three kinds of the time slots from #1 to #3 are assigned to respective three mobile stations. Due to this assignment, the three mobile stations assigned the time slots capable of performing communication at the same time. In this state, when a telephone call of one mobile station is concluded, the time slot assigned to the mobile station is transferred to another mobile station. This state is illustrated in FIG. 5 clearly. For instance, the time slot #3 assigned to the mobile station 2 is assigned to the mobile station 4 after a conclusion of the communication of the mobile station 2. FIG. 5 illustrates the state where assignment of the time slot is transferred to another mobile station when a telephone call of one mobile station is concluded.

Further, one time slot (as an example, time slot #1 in FIG. 5) is assigned for a calibration TDMA communication signal fixedly without reference to the state of communication of another mobile stations. According to this disposition, the calibration TDMA radio signal transmission section 310 is capable of transmitting the calibration TDMA radio signal constantly.

Operation of respective configuration elements within the base station 301 is the same as that of the embodiment 1 with the exception that processing is executed in accordance with the received signal of the TDMA system.

Namely, in a reception radio circuit 304 and a reception radio circuit 305, the TDMA radio signal from the mobile station 309 or the calibration TDMA radio signal from the calibration TDMA radio signal transmission section 310 received through a reception antenna 302 and a reception antenna 303 is subjected to the down-conversion in the same way as the embodiment 1.

Further, in a reception TDMA signal processing section B (for CAL) 307, the calibration TDMA radio signal which is subjected to the down-conversion due to respective the reception radio circuit 304 and the reception radio circuit 305 is observed in the same way as the embodiment 1, so that the characteristic errors described-above is obtained. The obtained characteristic errors are held in the compensation table in the same way as the embodiment 1.

Further, in the reception TDMA signal processing section A (for transmission) 306, TDMA demodulation processing is performed with respect to the TDMA radio signal from the mobile station 309, which is subjected to the down-conversion due to respective the reception radio circuit 304 and the reception radio circuit 305. At this time, the TDMA radio signal from the mobile station 309 is subjected to TDMA demodulation processing so as to compensate characteristic errors of the respective reception radio circuits while referring to contents of the compensation table transmitted from the recording section 108 at all times or intermittently in the same way as the embodiment 1.

Thus, according to the present embodiment, the respective different time slots are assigned to the respective TDMA radio signals of the respective mobile stations and the calibration TDMA radio signals. For that reason, the base station extracts the TDMA radio signal of the mobile station and the calibration TDMA radio signal individually. Further, since a time interval of the above-described time slot is very short, a result of the calibration is reflected surely to the communication between the base station and the respective mobile stations. For that reason, it is possible to execute the calibration processing in parallel without constituting an obstacle to the communication with respective mobile stations.

According to this disposition, the base station capable of performing the calibration processing while continuing communication with the respective mobile station, therefore, the base station is capable of executing smooth communication with the mobile stations, simultaneously, it is possible to improve accuracy of reception directivity of the reception signals.

Embodiment 3

An embodiment 3 utilizes a spreading code (channel) effectively while executing the calibration intermittently in the embodiment 1. In the embodiment 1, since the base station executes the calibration at all times, one spreading code is assigned to the calibration CDMA communication signal fixedly. In the embodiment 3, since the base station executes the calibration intermittently, one spreading code is assigned to the calibration CDMA communication signal on that only necessary case. Hereinafter, an array antenna radio communication apparatus according to the embodiment 3 will be described while taking notice of different points from the embodiment 1 referring to FIG. 6.

Figure 6:
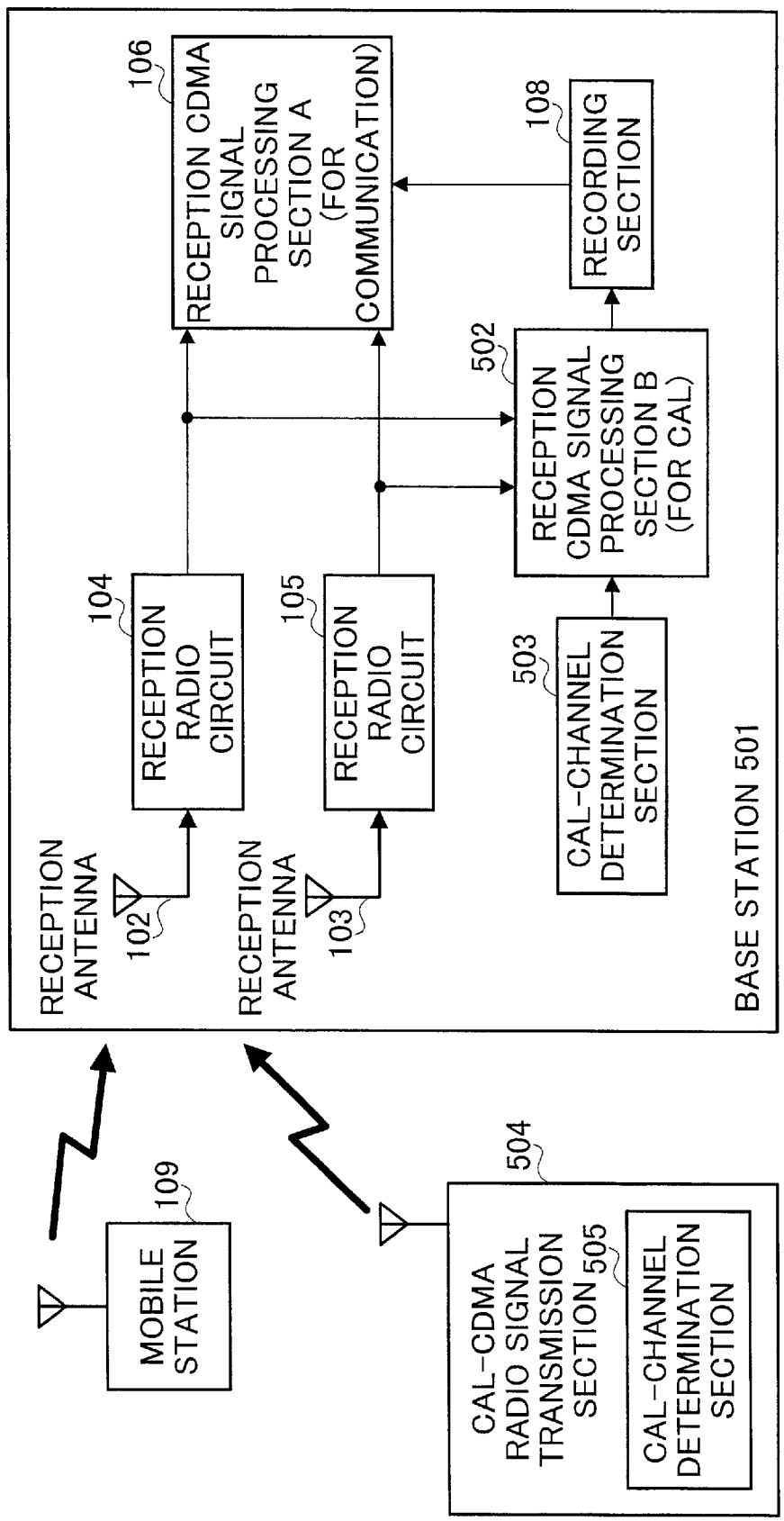
FIG. 6 is a block diagram illustrating a configuration of a communication system employing an array antenna radio communication apparatus according to an embodiment 3 of the present invention.

FIG. 6 is a block diagram illustrating a configuration of a communication system employing the array antenna radio communication apparatus according to the embodiment 3 of the present invention. Further, in FIG. 6, the same signs are added to the same configuration as that of the embodiment 1 (FIG. 2) to omit the detailed description.

A base station 501 is mounted with the array antenna radio communication apparatus according to the present embodiment. In the base station 501, when a CAL-channel determination section 503 receives requirement of the calibration from a control section which is not illustrated, the CAL-channel determination section 503 determines to assign a spreading code which is not employed as a spreading code for assigning to a calibration CDMA communication signal while monitoring an assignment state of the spreading codes (channels) for respective mobile stations. Further, the CAL channel determination section 503 transmits information with respect to the determined spreading code to a reception CDMA signal processing section B (for CAL) 502 and to the control section which is not illustrated.

The control section which is not illustrated informs information with respect to the determined spreading code for the sake of the calibration CDMA communication signal to a CAL-CDMA radio signal transmission section 504 through a transmission section (not illustrated) of another system.

The CAL-CDMA radio signal transmission section 504 receives the information with respect to the spreading code for the sake of the calibration CDMA communication signal from the base station 501. A CAL-channel determination section 505 provided for the CAL-CDMA radio signal transmission section 504 determines a spreading code for the sake of calibration CDMA communication on the basis of the information with respect to the above-described spreading code.

The CAL-CDMA radio signal transmission section 504 generates a calibration CDMA communication signal while employing the spreading code determined by the CAL-channel determination section 505.

In the base station 501 mounted with the array antenna communication apparatus of the above-described configuration, the reception CDMA signal processing section B (for CAL) 502 capable of measuring a deviation of respective reception radio circuits on the basis of the calibration CDMA communication signal which is subjected to the down-conversion due to respective the reception radio circuit 104 and the reception radio circuit 105 while employing the information with respect to the spreading code transmitted from the CAL-channel determination section 503.

Figure 7:
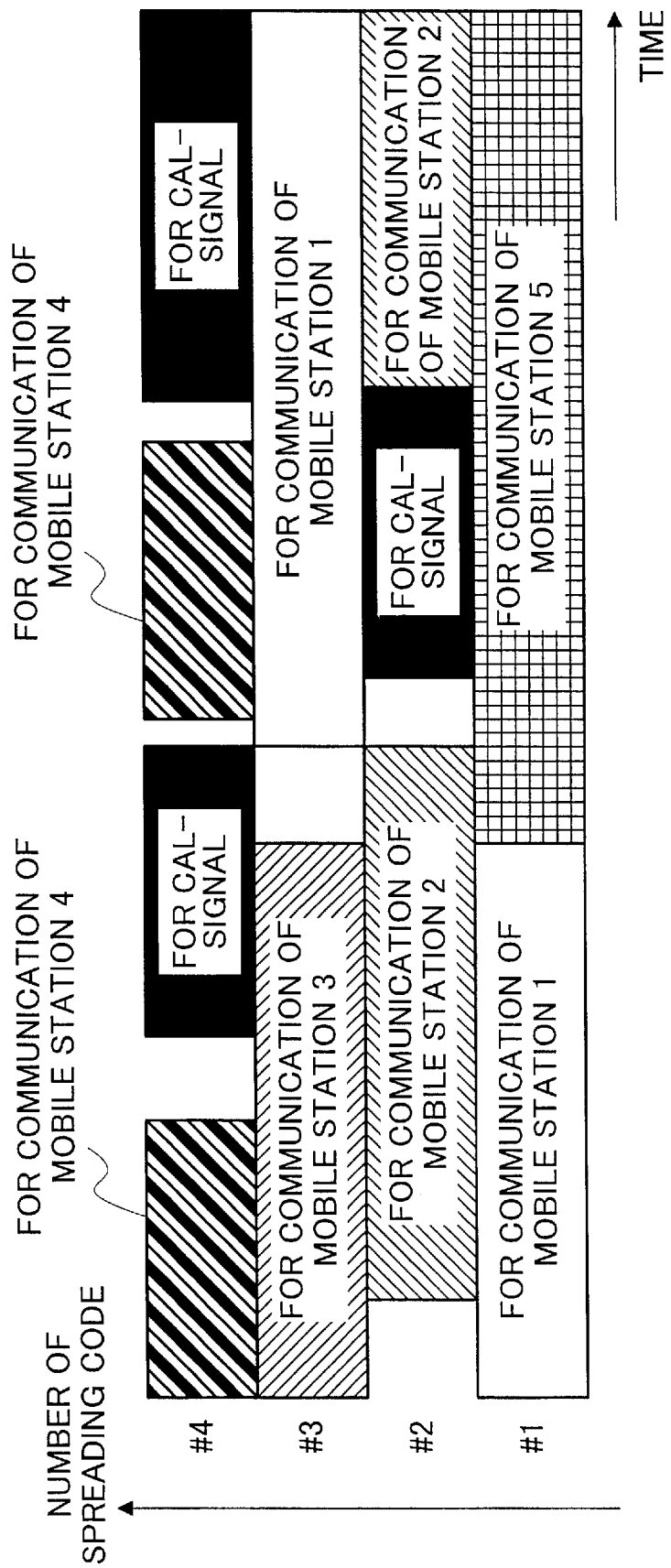
FIG. 7 is a view illustrating an assignment state of spreading codes in a communication system employing the array antenna communication apparatus according to the above-described embodiment 3.

Next, an assignment state of spreading codes in the communication system employing the array antenna communication apparatus of the above-described configuration will be further described while employing FIG. 7. FIG. 7 is a view illustrating an assignment state of spreading codes in a communication system employing the array antenna communication apparatus according to the embodiment 3 of the present invention.

When the CAL-channel determination section 503 receives a requirement of the calibration from the control section which is not illustrated, as illustrated in FIG. 7, the CAL-channel determination section 503 assigns a spreading code which is not employed, among spreading codes from #1 to #4 to a calibration CDMA communication signal while monitoring the assignment state of the spreading code to respective mobile stations. The spreading code assigned to the calibration communication signal is transferred to another mobile station in accordance with communication requirement after conclusion of the calibration.

Thus, according to the embodiment, in the communication of the CDMA system, when the calibration is executed intermittently, a spreading signal (channel) which is not employed is assigned to the calibration CDMA communication signal, further this spreading code is assigned to another mobile station for communication after termination of the calibration. For that reason, the base station is capable of performing the calibration intermittently without constituting an obstacle to the communication for respective mobile stations, and it is possible to utilize the spreading codes efficiently.

Embodiment 4

An embodiment 4 utilizes a time slot (channel) while executing the calibration intermittently in the embodiment 2. In the embodiment 2, since the base station executes the calibration at all times, one time slot is assigned fixedly to the calibration TDMA communication signal. In the embodiment 4, since the base station executes the calibration intermittently, one time slot is assigned to a calibration TDMA communication signal on that only necessary case.

Further, it is also possible to think that the embodiment 4 employs the TDMA system instead of the CDMA system in the embodiment 3. Hereinafter, an array antenna radio communication apparatus according to the embodiment 4 will be described while taking notice to different points from the embodiment 3 referring to FIG. 8.

Figure 8:
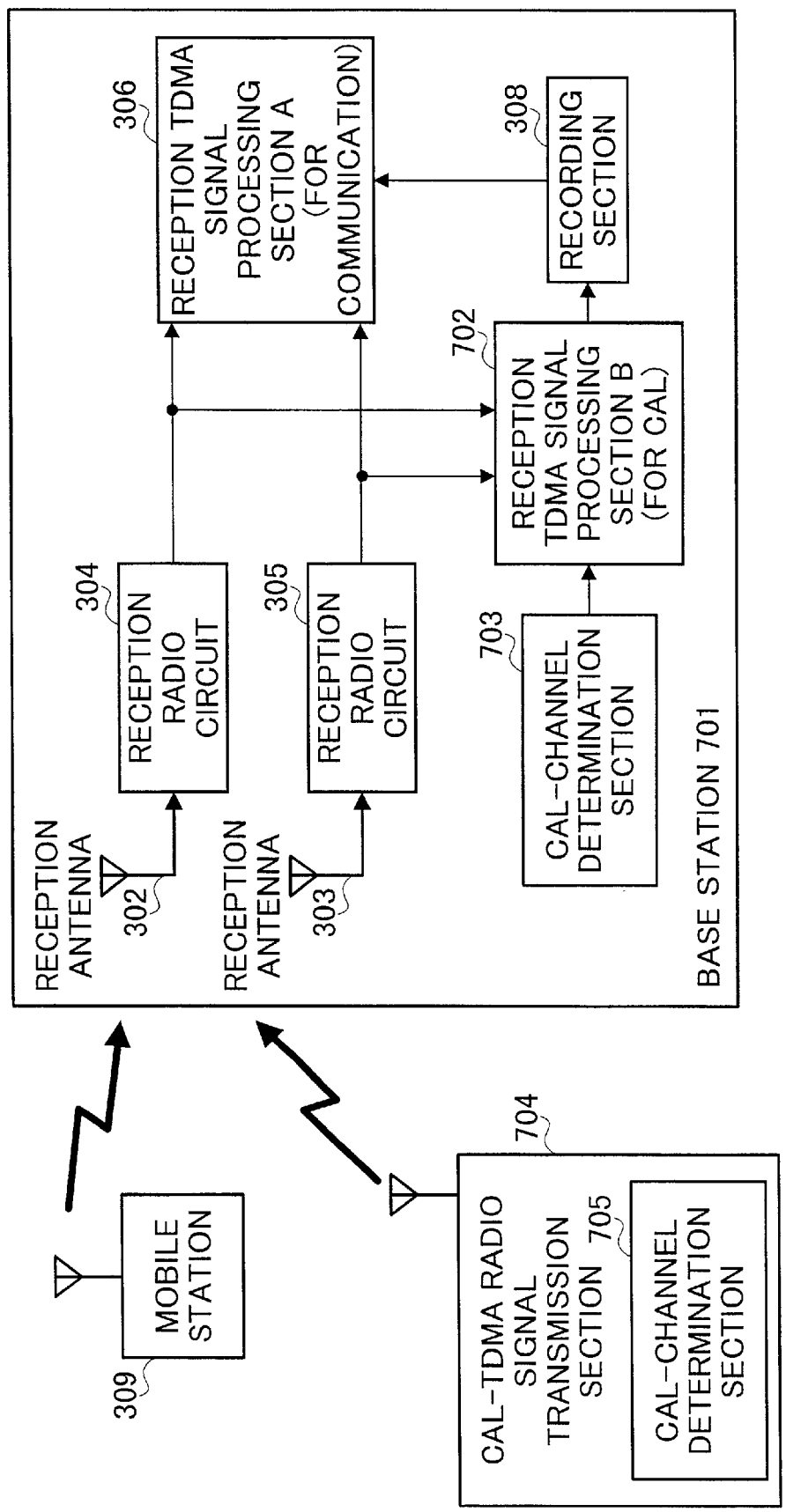
FIG. 8 is a block diagram illustrating a configuration of a communication system employing an array antenna radio communication apparatus according to an embodiment 4 of the present invention.

FIG. 8 is a block diagram illustrating a configuration of a communication system employing the array antenna radio communication apparatus according to the embodiment 4 of the present invention. Further, in FIG. 8, the same signs are added to the same configuration as that of the embodiment 3 (FIG. 6) to omit specific description.

A base station 701 is mounted with the array antenna radio communication apparatus according to the present embodiment. In the base station 701, when a CAL-channel determination section 703 receives requirement of the calibration from a control section which is not illustrated, the CAL-channel determination section 503 determines to assign a time slot which is not employed as a time slot for assigning to a calibration TDMA communication signal while monitoring an assignment state of the time slots (channels) to respective mobile stations. Further, the CAL channel determination section 703 transmits information with respect to the determined time s lot to a reception TDMA signal processing section B (for CAL) 702 and to the control section which is not illustrated.

The control section which is not illustrated informs information with respect to the determined time slot for the sake of the calibration TDMA communication signal to a CAL-TDMA radio signal transmission section 704 through a transmission section (not illustrated) of another system.

The CAL-TDMA radio signal transmission section 704 receives information with respect to the time slot for a calibration TDMA communication signal from the base station 701. A CAL-channel determination section 705 provided with the CAL-TDMA radio signal transmission section 704 determines a time slot for the sake of calibration TDMA communication on the basis of information concerning the above described time slot.

The CAL-TDMA radio signal transmission section 704 generates a calibration TDMA communication signal while employing the time slot determined by the CAL-channel determination section 705.

In the base station 701 mounted with the array antenna communication apparatus of the above-described configuration, the reception TDMA signal processing section B (for CAL) 702 capable of measuring a deviation of respective reception radio circuits on the basis of the calibration TDMA communication signal which is subjected to the down-conversion due to respective the reception radio circuit 304 and the reception radio circuit 305 while employing the information with respect to the time slot transmitted from the CAL-channel determination section 703.

Figure 9:
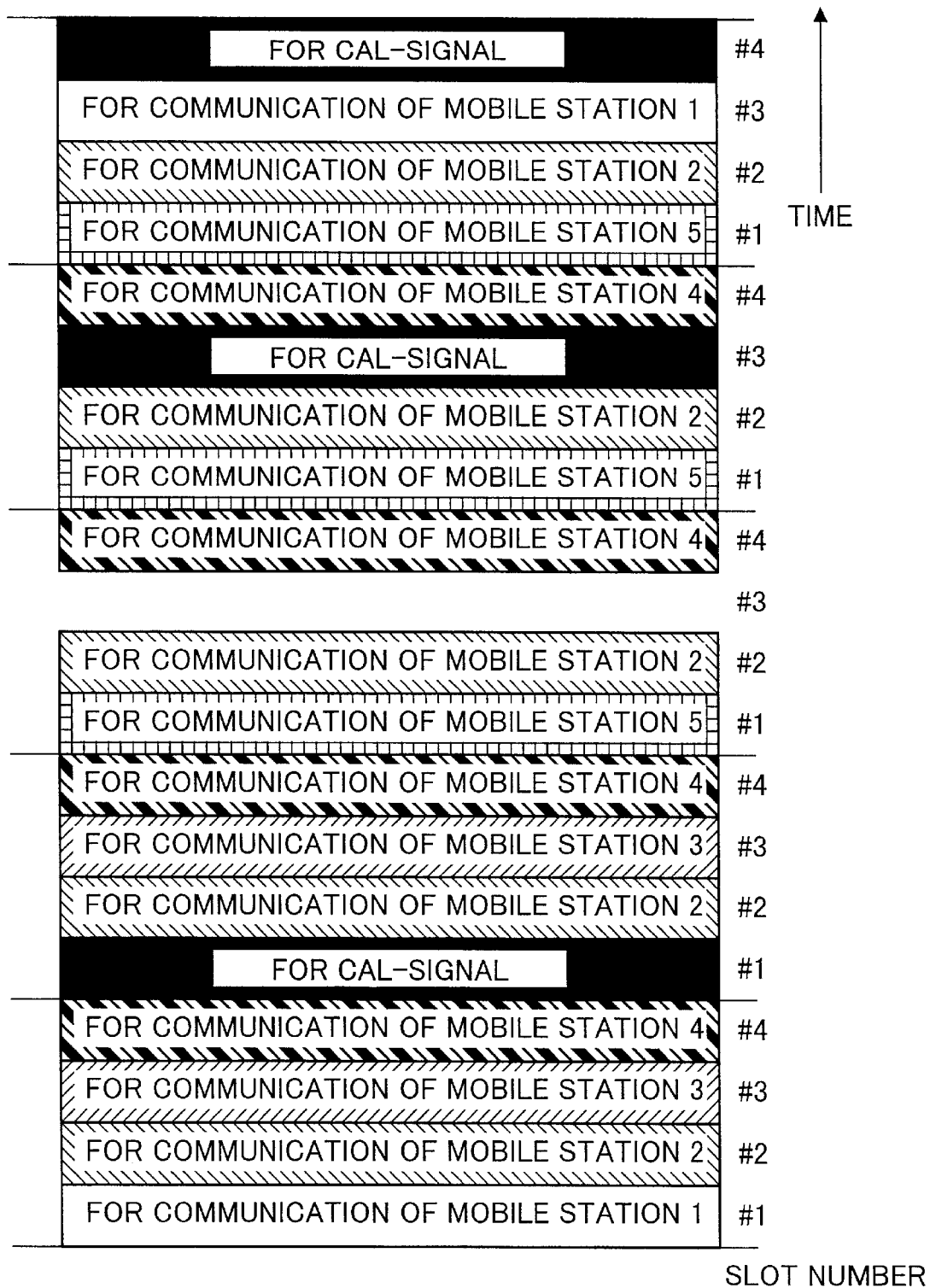
FIG. 9 is a view illustrating an assignment state of time slots in a communication system employing the array antenna communication apparatus according to the above-described embodiment 4.

Next, an assignment state of time slots in the communication system employing the array antenna communication apparatus of the above-described configuration will be further described while employing FIG. 9. FIG. 9 is a view illustrating an assignment state of time slots in a communication system employing the array antenna communication apparatus according to the embodiment 4 of the present invention.

When the CAL-channel determination section 703 receives a requirement of a calibration from the control section which is not illustrated, as illustrated in FIG. 9, the CAL-channel determination section 703 assigns a time slot which is not employed among time slots from #1 to #4 to a calibration TDMA communication signal while monitoring the assignment state of the time slot to respective mobile stations. The time slot assigned to the calibration communication signal is transferred to another mobile station with communication requirement after conclusion of the calibration.

Thus, according to the embodiment, in the communication of the TDMA system, when the calibration is executed intermittently, a time slot (channel) which is not employed is assigned to the calibration TDMA communication signal, further this time slot is assigned to another mobile station for communication after termination of the calibration. For that reason, the base station is capable of performing the calibration intermittently without constituting an obstacle to the communication for the respective mobile stations, and it is possible to utilize the time slots efficiently.

Embodiment 5

In an embodiment 5, a calibration signal transmission section is provided for a base station in the embodiments 1 to 4. Hereinafter, an array antenna radio communication apparatus according to the embodiment 5 will be described while taking notice of different points with reference to the embodiment 1 to the embodiment 4 referring to FIG. 10.

Figure 10:
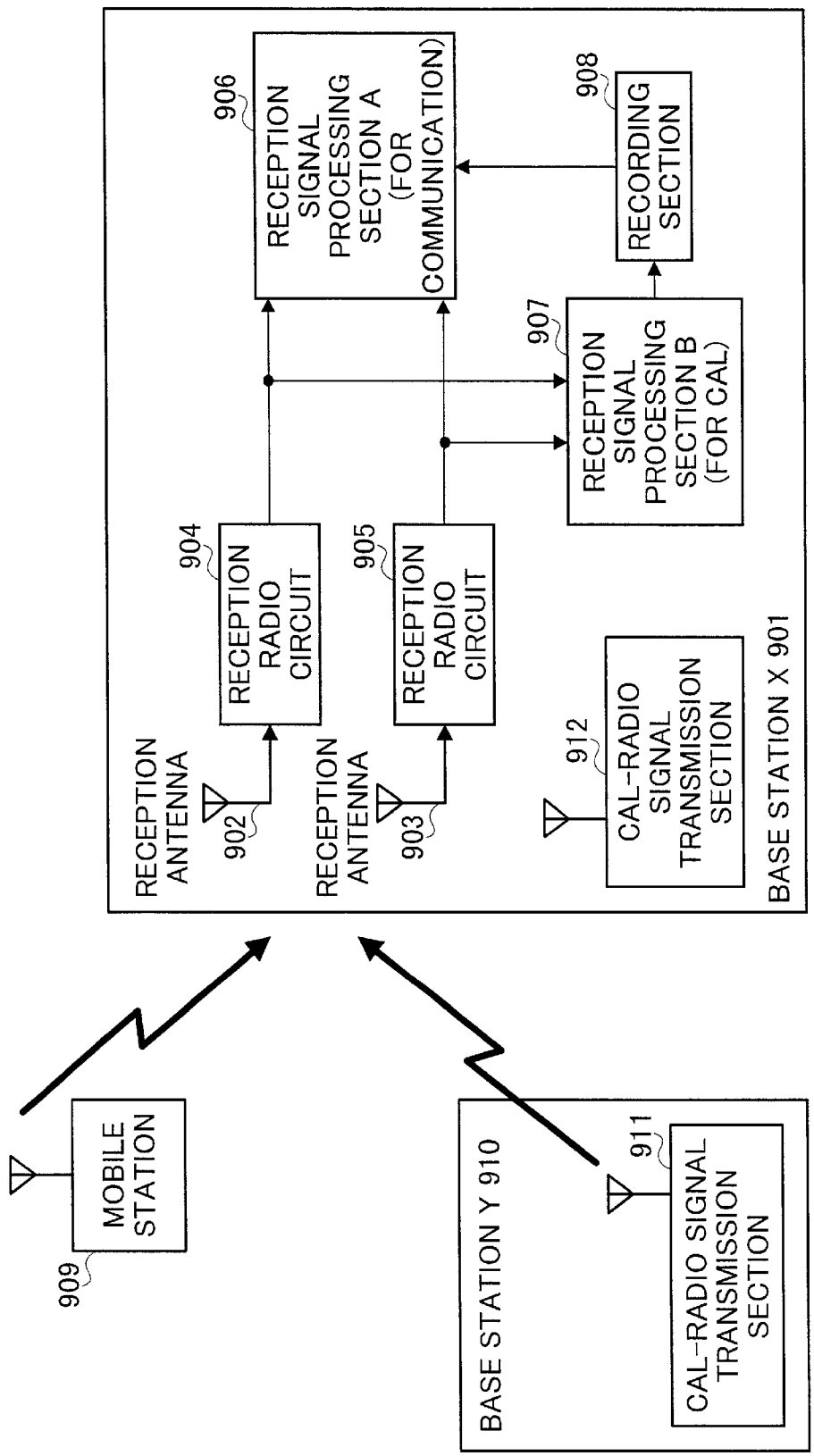
FIG. 10 is a block diagram illustrating a configuration of a communication system employing an array antenna radio communication apparatus according to an embodiment 5 of the present invention.

FIG. 10 is a block diagram illustrating a configuration of a communication system employing the array antenna radio communication apparatus according to the embodiment 5 of the present invention. In FIG. 10, the state is illustrated in which a base station (X) 901 provided with the array antenna communication apparatus according to the present embodiment performs communication with a mobile station 909. Further, in FIG. 10, a specific description is omitted in connection with the same configuration as that of the embodiment 1 to the embodiment 4.

A base station (Y) 910 has the same configuration as the base station (X) 901. The base station (Y) 910 is placed at a known place for the base station 901. Further, the base station (Y) 910 generates a calibration communication signal.

In the base station (X) 901, a reception signal processing section B (for CAL) 907 measures deviations of respective reception radio circuits on the basis of communication signals for the calibration from the base station (Y) 910, which are subjected to the down-conversion due to respective the reception radio circuit 904 and the reception radio circuit 905, followed by holding the measurement result into a compensation table of a recording section 908.

A reception signal processing section A (for transmission) 906 performs demodulation processing to communication signals from the mobile station 909, which are subjected to the down-conversion due to the respective reception radio circuit 904 and reception radio circuit 905. On the occasion of the demodulation processing, the reception signal processing section A (for transmission) 906 performs the demodulation processing so as to compensate characteristic errors of respective reception radio circuits at all times or intermittently while referring to the compensation table of the recording section 908.

A CAL-radio signal transmission section 912 generates the communication signal for the calibration for the sake of the calibration for another base station (for instance, base station (Y) 910). Further, the above-described configuration elements can be matched to any communication of the CDMA system or the TDMA system.

Thus, according to the present embodiment, since the calibration signal transmission section for generating the communication signal for the calibration is provided within another base station, it is possible to suppress a scale of the whole communication system and costs in comparison with the case where the calibration signal transmission section is set independently.

Embodiment 6

An embodiment 6 executes the calibration without employment of a calibration signal transmission section in the embodiments 1 to 5. Hereinafter, an array antenna radio communication apparatus according to the embodiment 6 will be described while taking notice of different points from the embodiment 1 to the embodiment 5 referring to FIG. 11.

Figure 11:
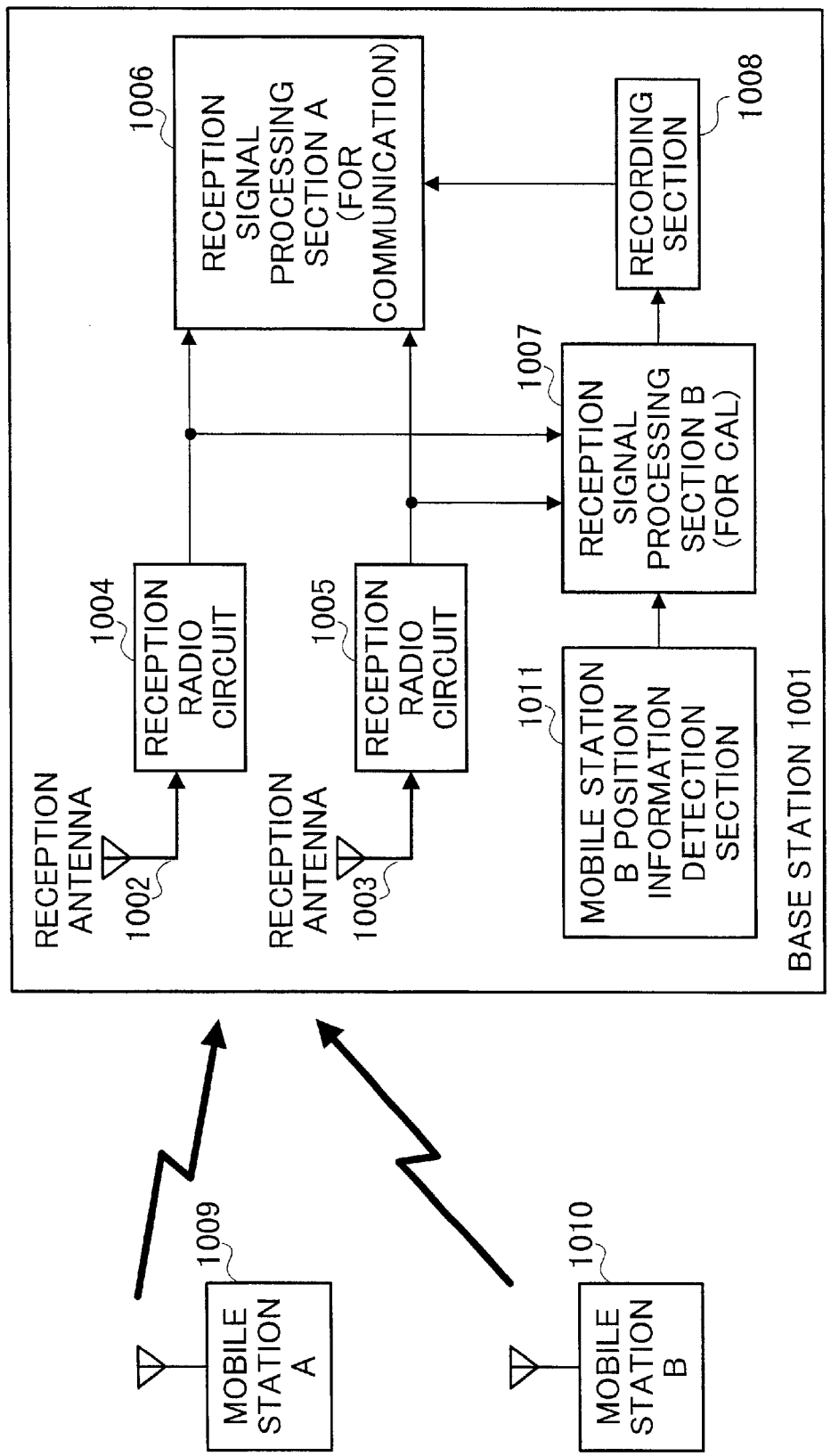
FIG. 11 is a block diagram illustrating a configuration of a communication system employing an array antenna radio communication apparatus according to an embodiment 6 of the present invention.

FIG. 11 is a block diagram illustrating a configuration of a communication system employing the array antenna radio communication apparatus according to the embodiment 6 of the present invention. In FIG. 11, the state is illustrated, in which a base station 1001 provided with the array antenna communication apparatus according to the present embodiment performs communication with a mobile station. In the present embodiment, in order to simplify a description, there will be described the case where a mobile station (A) 1009 and a mobile station (B) 1010 as the mobile station perform communication with a base station 1001. Further, in FIG. 11, a specific description is omitted with reference to the same configuration as that of the embodiment 1 to the embodiment 5.

The mobile station B 1010 measures a position of an own station, followed by transmitting signals causing information in connection with the measured position to be included for the base station 1001.

In the base station 1001, a mobile-station-B position information detection section 1011 receives signals in which information with reference to the above described position transmitted from the mobile station (B) 1010 is included, followed by detecting a position of the mobile station (B) 1010. Further, the mobile-station-B position information detection section 1011 transmits information with reference to the position of the detected mobile station (B) 1010 to a reception signal processing section B (for CAL) 1007.

Now, it is essential for executing the calibration that a calibration signal and a position of an apparatus for generating the signal be obtained. Here, since a position of the mobile station (B) 1010 is known described-above, communication signals from the mobile station (B) 1010 can be come into communication signals for the calibration. Consequently, when the communication signals from the mobile station (B) 1010 are employed, it becomes possible to perform the calibration.

The reception signal processing section B (for CAL) 1007 measures deviations of respective reception radio circuits while employing communication signals from the mobile station (B) 1009, which are subjected to the down-conversion due to respective the reception radio circuit 1004 and the reception radio circuit 1005, followed by holding measurement results into a compensation table of a recording section 1008.

A reception signal processing section A (for communication) 1006 performs demodulation processing against the communication signals from the mobile station (A) 1009, which are subjected to the down-conversion due to respective the reception radio circuit 1004 and the reception radio circuit 1005. On the occasion of the demodulation processing, the reception signal processing section A (for communication) 1006 performs the demodulation processing so as to compensate characteristic errors of respective reception radio circuits at all times or intermittently while referring to the compensation table of the recording section 1008.

Further, needless to say, the communication signals from the mobile station B are not employed for the communication signal for the calibration exclusively, but the communication signals are also subjected to ordinary demodulation processing. Moreover, the above-described respective configuration elements can be matched off against any communication of the CDMA system or the TDMA system.

Thus according to the present embodiment, since when a position of one mobile station is detected from among a plurality of mobile stations performing communication, it is possible to employ the communication signals of the mobile station as the communication signals for the calibration, it is not necessary to provide an apparatus for generating the communication signals for the calibration independently. For that reason, it is possible to suppress a scale of the whole communication system and costs.

Moreover, in the present embodiment, the mobile station (B) 1010 transmits information with reference to the position that the mobile station (B) 1010 has measured while utilizing the GPS and so forth in order that the base station 1001 obtains information with reference to the position of the mobile station (B) 1010. Then, the mobile-station-B position information detection section 1011 within the base station 1001 detects a position of the mobile station (B) 1010 from the above-described information. There is described the case where the above method is employed. However, the present invention is not limited by this disposition. The invention is applicable to the case where the mobile-station-B position information detection section 1011 is provided with a data base indicating an existence position of the mobile station B with its position known beforehand.

Embodiment 7

An embodiment 7 executes the calibration while employing a calibration communication signal generation section provided within an own station, instead of the method for employing a calibration communication signal generation section provided within another base station in the embodiment 5. Hereinafter, an array antenna radio communication apparatus according to the embodiment 7 of the present invention will be described while taking notice of different points from the embodiment 5 referring to FIG. 12.

Figure 12:
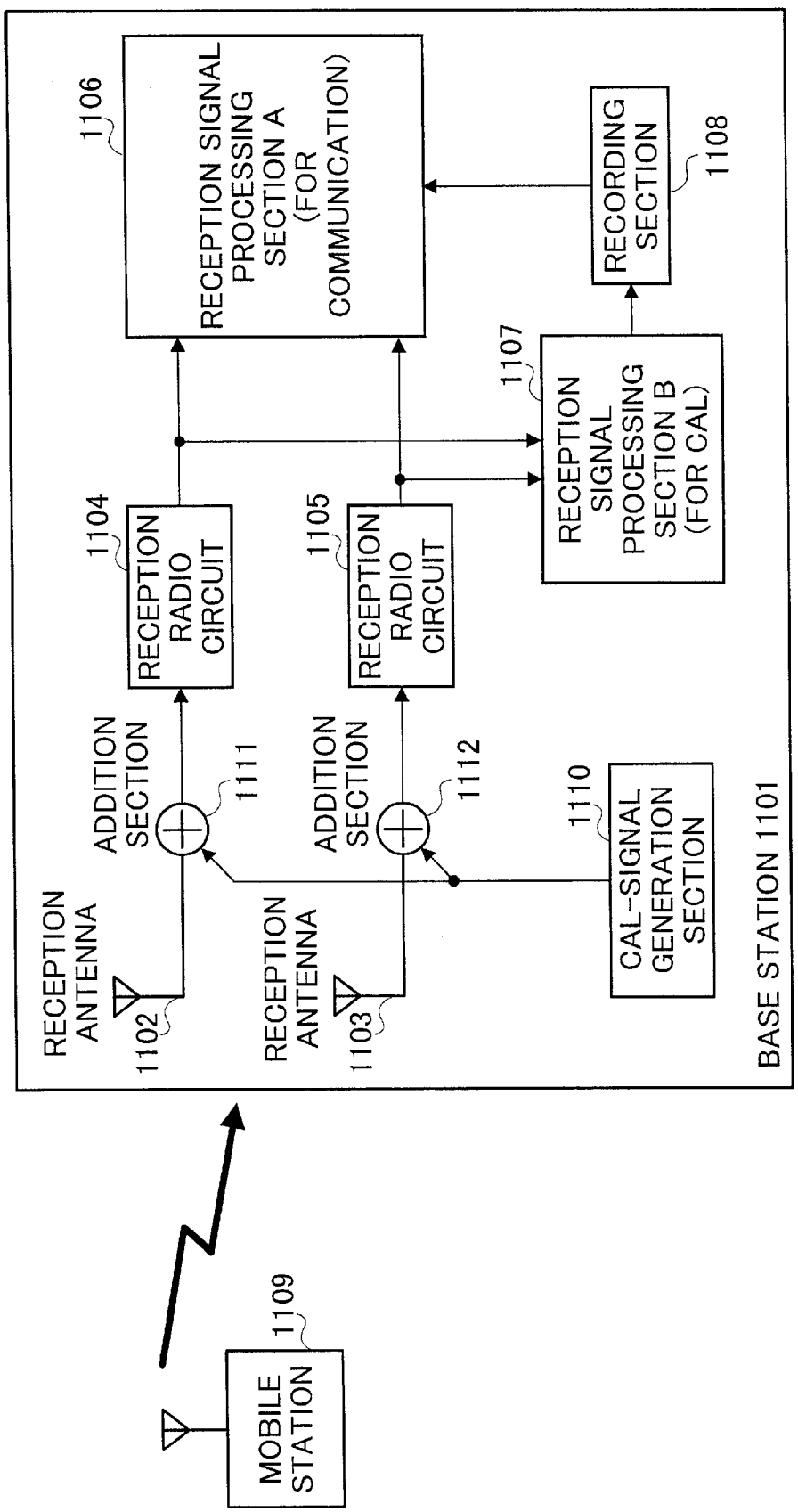
FIG. 12 is a block diagram illustrating a configuration of a communication system employing an array antenna radio communication apparatus according to an embodiment 7 of the present invention.

FIG. 12 is a block diagram illustrating a configuration of a communication system employing the array antenna radio communication apparatus according to the embodiment 7 of the present invention. Further, in FIG. 12, a specific description is omitted in connection with the same configuration elements as that of the embodiment 5.

In a base station 1101, a CAL-signal generation section 1110 generates a calibration signal to transmit to both of an addition section 1111 and an addition section 1112. The calibration signal is one which is subjected to the same processing (frequency conversion and demodulation and so forth) as a communication signal from a mobile station 1109, which is received through both of a reception antenna 1102 and a reception antenna 1103.

The addition section 1111 and the addition section 1112 add the communication signals received through the respective reception antenna 1102 and reception antenna 1103, and the calibration signals of the CAL-signal generation section 1110.

Further, since a position of the CAL-signal generation section 1110 is known, a reception signal processing section B (for CAL) 1107 is capable of measuring deviations of both of the reception radio circuit 1104 and the reception radio circuit 1105 in the same way as the embodiment 5.

Thus, according to the present embodiment, since the calibration signal can be obtained within the base station, it is not necessary to provide an apparatus for generating the communication signal for the calibration in the outer position of the base station. For that reason, it is possible to further suppress a scale of the whole communication system and costs.

Embodiment 8

An embodiment 8 integrates a reception signal processing section for measuring deviations of respective reception radio circuits and a reception signal processing section for performing demodulation processing into one reception signal processing section. Hereinafter, an array antenna communication apparatus according to the present embodiment will be described while taking example of FIG. 3 in the case where communication of the TDMA system is performed in order to simplify an explanation.

Figure 13:
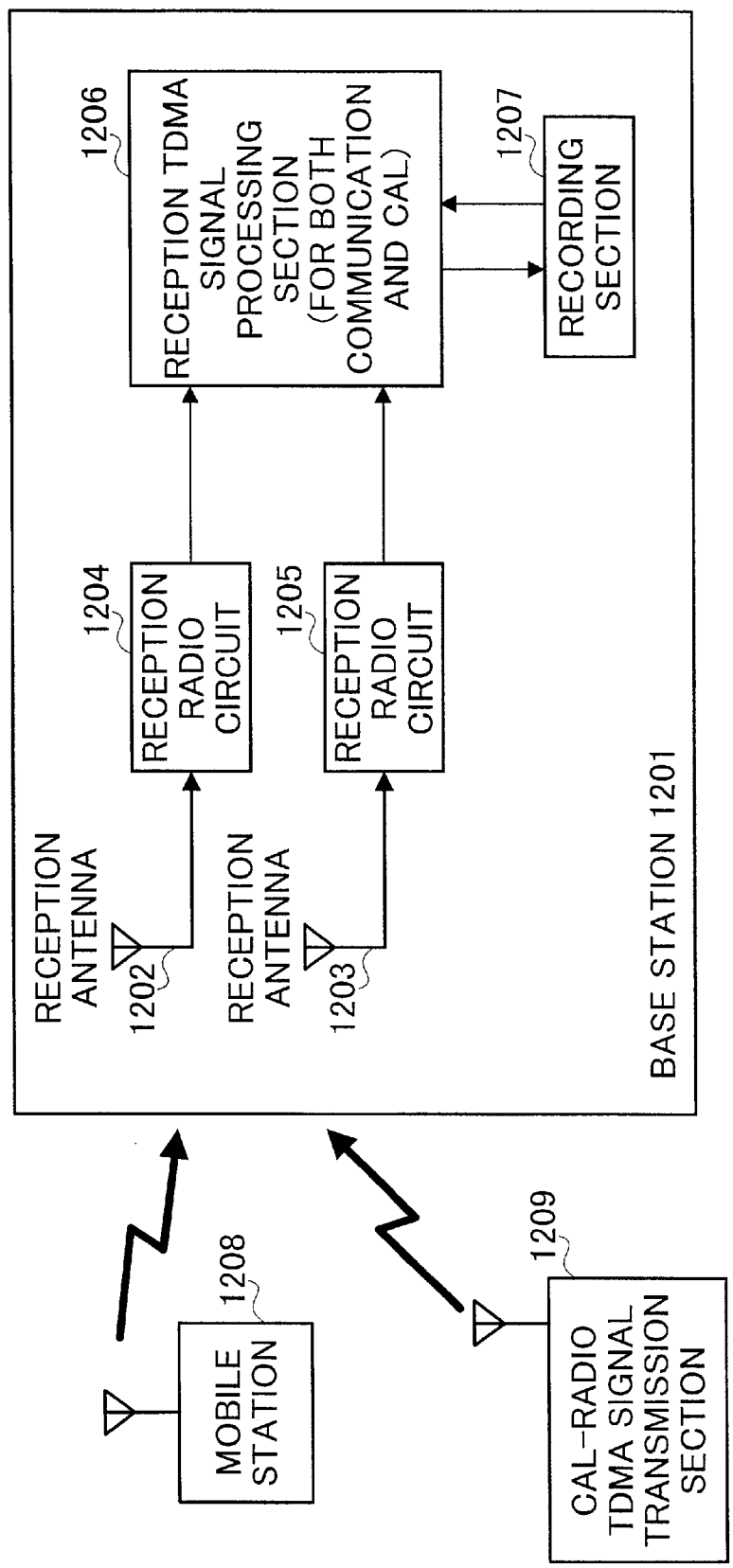
FIG. 13 is a block diagram illustrating a configuration of a communication system employing an array antenna radio communication apparatus according to an embodiment 8 of the present invention.

FIG. 13 is a block diagram illustrating a configuration of a communication system employing the array antenna communication apparatus according to the embodiment 8 of the present invention. Further, in FIG. 13, a specific explanation is omitted with reference to the same configuration as that of the embodiment 1 to the embodiment 7. Furthermore, in the present embodiment, there will be described the case where the calibration TDMA communication signal transmission section given in the embodiment 2 (FIG. 4) is placed in the outer section of the base station. However, the present invention is not limited from the above described case, but the present invention is applicable to any case described in the embodiment 1 to the embodiment 7.

A reception TDMA signal processing section (for both communication and CAL) 1206 selects to execute one of either TDMA demodulation processing against communication signals from a mobile station 1208 received through a reception antenna 1202 and a reception antenna 1203 or measurement of deviations of a reception circuit 1204 and a reception circuit 1205 on the basis of a received calibration TDMA radio signal from a CAL radio TDMA signal transmission section 1209 due to a switching section (not illustrated) provided in the internal section. This is executed in accordance with assignment contents of time slots as described in the embodiment 2.

Further, the reception TDMA signal processing section (for both communication and CAL) 1206, on the occasion of measurement of deviations of respective reception circuits, holds the above measured deviations in the compensation table of the recording section 1207, while on the occasion of the TDMA demodulation processing, the reception TDMA signal processing section (for both communication and CAL) 1206 performs the TDMA demodulation processing so as to compensate the characteristic errors of respective reception radio circuits at all times or intermittently while referring to the compensation table of the recording section 1207.

Thus, according to the present embodiment, since the reception signal processing section for measuring the deviations of respective reception radio circuits and the reception signal processing section for performing the demodulation processing are integrated into one reception signal processing section, it is possible to suppress a circuit scale within the base station.

Moreover, according to the present embodiment, there has been described the case where the communication of the TDMA system is performed, however, the present invention is not limited from such case, but the present invention is also applicable to the case where the communication of the CDMA system is performed.

The array antenna radio communication apparatus of the present invention adopts a configuration provided with frequency conversion means for performing frequency conversion against reception signals that communication signals and calibration signals are multiplexed into the same frequency band, extraction means for extracting respective signals from the reception signals undergoing frequency conversion, calibration means capable of performing calibration processing in the middle of communication while employing the communication signal on the basis of calibration signals extracted previously, and demodulation means for demodulating the extracted communication signal on the basis of a result of the calibration processing.

According to this configuration, since the communication signal and the calibration signal are multiplexed into the same frequency band to be transmitted, it is possible to extract respective signals individually. For that reason, it becomes possible to demodulate respective signals at the same time, therefore, it is possible to perform communication between an array antenna radio communication apparatus and respective mobile stations, and calibration processing at the same time. Consequently, it is possible to provide an array antenna radio communication apparatus that performs the calibration processing while continuing communication with respective mobile station.

The array antenna radio communication apparatus of the present invention adopts a configuration provided with extraction means for extracting respective signals from the reception signals that at least two communication signals are multiplexed into the same frequency band, position detection means for detecting a position of a communication partner for performing communication employing the communication signal, calibration means capable of performing calibration processing in the middle of communication employing the communication signals, on the basis of both of the position of detected one side of the communication partner and the extracted communication signals which the communication partner employs, and demodulation means for demodulating the extracted communication signals employed by another communication partner on the basis of a result of the calibration processing.

According to this configuration, since a position of one side of a communication partner becomes known, it is possible to perform the calibration while employing the position of the communication partner and the communication signal that the communication partner employs. For that reason, it is possible to demodulate the communication signals which the communication partner employs. Further, since the communication signals which the respective communication partners employ are transmitted while employing the same frequency band, it is possible to perform both of the above-described calibration processing and the above-described demodulation processing at the same time. Consequently, since it is not necessary to provide separately an apparatus for generating calibration signals, it is possible to reduce a scale of the whole communication system and costs.

The array antenna radio communication apparatus of the present invention adopts a configuration provided with signal generation means for generating calibration signals, addition means for adding reception signals including the communication signals and the calibration signals, frequency conversion means for performing frequency conversion against added signals, extraction means for extracting respective signals from the frequency converted signals, calibration means capable of executing calibration processing on the basis of the extracted calibration signals, in the middle of communication employing the communication signals, and demodulation means for demodulating the extracted communication signals on the basis of a result of the calibration processing.

According to this configuration, as the calibration signal, which is necessary for the calibration processing, the calibration signals included in reception signals are not employed, but the calibration signals generated due to signal generation means within an apparatus body are employed. For that reason, since it becomes not necessary to provide an apparatus for generating the calibration signals separately, it is possible to reduce a scale of the whole communication system and costs.

The array antenna radio communication apparatus adopts a configuration in which calibration means executes calibration processing at the same time of demodulation of the demodulation means or the intermittent calibration processing of the calibration means.

According to this configuration, since the calibration means executes the calibration processing simultaneously or intermittently in parallel with demodulation processing due to demodulation means, the calibration processing is executed appropriately in accordance with accuracy of necessary reception directivity without constituting an obstacle to communication with a communication partner.

The array antenna radio communication apparatus of the present invention adopts a configuration provided with channel determination means for determining channels to assign the channel to calibration signals on the basis of an assignment state of channels against communication signals, and extraction means for extracting calibration signals on the basis of the determined channel.

According to this configuration, an appropriate channel is assigned to calibration signals by the channel determination means on the basis of an assignment state of channels which are employed for communication signals of respective communication partners, subsequently, the calibration signals transmitted while employing the assigned channels are received. Further, the calibration signals are extracted surely from the received signals by the extraction means on the basis of the above-described channels. For that reason, it is possible to utilize communication channels employed for both communication with a communication partner and communication of calibration signals efficiently according to an utilization state.

The array antenna radio communication apparatus of the present invention adopts a configuration provided with signal generation means for generating calibration signals for a communication partner, wherein the calibration signals multiplexed onto reception signals are signals transmitted from the communication partner in the middle of communication.

According to this configuration, since the signal generation means generates the calibration signals, which signals are employed for another communication partner, and it is possible to execute the calibration processing while employing the calibration signals transmitted from the another communication partner, it is not necessary to provide an apparatus for generating the calibration signals separately. For that reason, it is possible to reduce a scale of the whole communication system and costs.

The array antenna radio communication apparatus of the present invention adopts a configuration in which reception signals are subjected to multiplexing of a Code Division Multiple Access system.

According to this configuration, since the communication signals, which are employed by the communication partner, and the calibration signals are multiplexed into the same frequency band due to the Code Division Multiple Access system, the respective signals are extracted surely, followed by being demodulated.

The array antenna radio communication apparatus of the present invention adopts a configuration in which reception signals are subjected to multiplexing of a Time Division Multiple Access system.

According to this configuration, since the communication signals, which are employed for the communication partner, and the calibration signals are multiplexed into the same frequency band due to the Time Division Multiple Access system, respective signals are extracted surely, followed by being demodulated.

The base station apparatus of the present invention adopts a configuration provided with either one of the above-described array antenna radio communication apparatus.

According to this configuration, since the base station is mounted with the array antenna radio communication apparatus which executes the calibration processing while continuing communication with a mobile station, it is possible to provide the base station implementing excellent communication.

The radio communication terminal apparatus of the present invention adopts a configuration to perform radio communication with the above-described base station.

According to this configuration, since the communication is performed to the base station mounted with the array antenna radio communication apparatus which executes the calibration processing while continuing the communication with the mobile station, it is possible to provide the radio communication terminal apparatus performing excellent communication.

The array antenna radio communication method of the present invention comprises the steps of a frequency conversion step for performing frequency conversion against reception signals that the communication signals and the calibration signals are multiplexed into the same frequency band, an extraction step for extracting respective signals from reception signals undergoing frequency conversion, a calibration step in which calibration processing is capable of performing on the basis of extracted calibration signals in the middle of communication while employing the communication signals, and a demodulation process for demodulating the extracted signal for the communication on the basis of a result of the calibration processing.

According to this method, since the signal for the communication and the calibration signal are multiplexed into the same frequency band, followed by being transmitted, it is possible to extract respective signals individually. For that reason, since it becomes possible to demodulate respective signals at the same time, it is possible to execute both of the communication with respective mobile stations and the calibration processing at the same time. Consequently, it is possible to provide the array antenna radio communication apparatus executing the calibration processing while continuing the communication with respective mobile stations.

As described above, by determining a frequency band used for communication for respective communication ends and a frequency band used for communication of radio signals for the calibration so that each frequency is identical, thereby enabling to demodulate communication signals and calibration signals at the same time, it is possible to provide the array antenna radio communication apparatus for executing the calibration processing while continuing communication with the mobile station.

This application is based on the Japanese Patent Application No. HEI 11-095418 filed on Apr. 1, 1999, entire content of which is expressly incorporated by reference herein.

Industrial Applicability

The present invention is appropriate to utilize for a field of mobile radio communication.

What is claimed is:

1. An array antenna radio communication apparatus comprising:

frequency conversion means for performing frequency conversion on reception signals in which a communication signal and a calibration signal are multiplexed into the same frequency band;

extraction means for extracting each signal from the reception signals which is subjected to the frequency conversion;

calibration means which is capable of performing calibration processing based on the extracted calibration signals in the middle of communication using the communication signals; and demodulation means for demodulating the extracted communication signals based on the result of the calibration processing.

2. An array antenna radio communication apparatus according to claim 1, wherein said calibration means executes calibration processing at the same time or intermittently of the demodulation of the demodulation means.

3. An array antenna radio communication apparatus according to claim 1, further comprising channel determination means for determining channel assigned to the calibration signals based on an state of channels assigned to communication signals, and extraction means extracts calibration signal based on the determined channel.

4. An array antenna radio communication apparatus according to claim 1, further comprising signal generation means for generating calibration signal for a communication end, wherein calibration signal multiplexed onto reception signals are signals transmitted from a communication end in the middle of communication.

5. An array antenna radio communication apparatus according to claim 1, wherein reception signals are subjected to multiplexing of a Code Division Multiple Access system.

6. An array antenna radio communication apparatus according to claim 1, wherein reception signals are subjected to multiplexing of a Time Division Multiple Access system.

7. An array antenna radio communication apparatus comprising:

extraction means for extracting each signal from reception signals in which at least two communication signals are multiplexed into the same frequency band;

position detection means for detecting positions of communication ends which perform communication using the communication signals;

calibration means capable of performing calibration processing based on the detected position of one of the communication ends and the extracted communication signal which is used by the one of the communication ends in the middle of communication using the communication signals; and demodulation means for demodulating the extracted communication signal used by another communication end based on a result of the calibration processing.

8. An array antenna radio communication apparatus comprising:

signal generation means for generating calibration signals;

addition means for adding reception signals including the communication signals and the calibration signals;

frequency conversion means for performing frequency conversion on the added signals;

extraction means for extracting each signal from the signals which is subjected to the frequency conversion;

calibration means capable of executing calibration processing based on the extracted calibration signals in the middle of communication using the communication signals; and demodulation means for demodulating the extracted communication signals based on a result of the calibration processing.

9. A base station apparatus provided with an array antenna radio communication apparatus, wherein said array antenna radio communication apparatus comprises:

frequency conversion means for performing frequency conversion on reception signals in which a communication signal and a calibration signal are multiplexed into the same frequency band;

extraction means for extracting each signal from the reception signals which is subjected to the frequency conversion;

calibration means which is capable of performing calibration processing based on the extracted calibration signals in the middle of communication using the communication signals; and demodulation means for demodulating the extracted communication signals based on the result of the calibration processing.

10. A radio communication terminal apparatus performing radio communication with a base station provided with an array antenna radio communication apparatus, wherein said array antenna radio communication apparatus comprises:

frequency conversion means for performing frequency conversion on reception signals in which a communication signal and a calibration signal are multiplexed into the same frequency band;

extraction means for extracting each signal from the reception signals which is subjected to the frequency conversion;

calibration means which is capable of performing calibration processing based on the extracted calibration signals in the middle of communication using the communication signals; and demodulation means for demodulating the extracted communication signals based on the result of the calibration processing.

11. An array antenna radio communication method comprising the steps of:

frequency conversion step for performing frequency conversion on reception signals in which a communication signal and a calibration signal are multiplexed into the same frequency band;

extraction step for extracting each signal from the reception signals which is subjected to the frequency conversion;

calibration step which is capable of performing calibration processing based on the extracted calibration signals in the middle of communication using the communication signals; and demodulation step for demodulating the extracted communication signals based on the result of the calibration processing.

* * * * *